United States Patent
Jenness

(10) Patent No.: US 6,324,212 B1
(45) Date of Patent: Nov. 27, 2001

(54) APPARATUS USING LOW SPECTRUM SELECTIVELY FOR PROVIDING BOTH ADSL AND POTS SERVICE

(75) Inventor: Robert Jenness, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/249,924

(22) Filed: Feb. 12, 1999

(51) Int. Cl.[7] .................................. H04B 1/38; H04L 5/16
(52) U.S. Cl. ......................... 375/222; 375/219; 370/465; 370/468; 370/494; 370/495; 379/93.01; 379/93.09
(58) Field of Search .................................... 375/222, 220, 375/221, 232, 219; 370/487, 480, 203, 210, 465, 468, 484, 494, 495; 379/93.01, 93.08, 93.09, 93.28, 93.31

(56) References Cited

U.S. PATENT DOCUMENTS

| | | | |
|---|---|---|---|
| 6,061,392 | * 5/2000 | Bremer et al. | 370/487 |
| 6,151,335 | * 11/2000 | Ko et al. | 370/487 |
| 6,167,095 | * 12/2000 | Furukawa et al. | 375/285 |
| 6,192,109 | * 2/2001 | Amrany et al. | 379/30 |

* cited by examiner

*Primary Examiner*—Chi Pham
*Assistant Examiner*—Dung X. Nguyen

(57) ABSTRACT

Asymmetric Digital Subscriber Line (ADSL) data service and Plain Old Telephone Service (POTS) are provided over a subscriber loop by an ADSL transceiver and a control processor located in a local communication center, and a subscriber ADSL modem at the subscriber location. The control processor is responsive to a detection of an origination of a POTS call for generating a first control signal that causes the ADSL transceiver to load ADSL data into tone bins which are only in a frequency band above a predetermined frequency band used for a POTS call for data transmissions over the subscriber loop. The control processor is also responsive to a detection of a termination of a POTS call for generating a second control signal that causes the ADSL transceiver to load ADSL data into tone bins which are in both the predetermined frequency band used for a POTS call and the frequency band thereabove for ADSL data transmissions over the subscriber loop. The subscriber ADSL modem is responsive to third and fourth control signals received from the control processor and multiplexed into the ADSL data transmissions, to load ADSL data into tone bins which are only in a frequency band above a predetermined frequency band used for a POTS call, and load ADSL data into tone bins which are in both the predetermined frequency band used for a POTS call and the frequency band thereabove for ADSL data transmissions over the subscriber loop, respectively.

20 Claims, 4 Drawing Sheets

APPARATUS USING LOW SPECTRUM SELECTIVELY FOR PROVIDING BOTH ADSL AND POTS SERVICE

CROSS REFERENCE TO RELATED APPLICATIONS

This application expressly claims the benefit of earlier filing date and right of priority from the following co-pending patent applications, all of which are assigned to the assignee of the present invention and have the same inventor: U.S. Provisional Application Serial No. 60/081,116, filed on Apr. 8, 1998, entitled "Use of Low Spectrum Selectively for both ADSL and POTS", and U.S. Provisional Application Serial No. 60/084,566, filed on May 7, 1998, entitled "Use of Low Spectrum Selectively for both ADSL and POTS in G.Lite", and to an application entitled "Method Using Low Spectrum Selectively For Providing Both ADSL And POTS Service" which is being filed concurrently with the present application. Each cited patent application is expressly incorporated in its entirety by reference.

FIELD OF THE INVENTION

The present invention relates to apparatus using low spectrum selectively for both Asymmetric Digital Subscriber Line (ADSL) and Plain Old Telephone Service (POTS) service over a single loop by adding predetermined control messages to allow rapid mode switching between just ADSL service and combined ADSL and POTS service based on central office or subscriber events indicating voice call initiation.

BACKGROUND OF THE INVENTION

Asymmetric Digital Subscriber Line (ADSL) is defined, and pertinent standards information thereto is provided, in the Standards Document T1E1.4/98-007R1 entitled "Standards Project for Interfaces Relating to Carrier to Customer Connection of Asymmetrical Digital Subscriber Line (ADSL) Equipment", Sept. 26, 1997, and subsequent revisions edited by Bingham and Van der Putten. More particularly, Asymmetric Digital Subscriber Line (ADSL) has been defined as consisting of a pair of Discrete Multitone (DMT) modems, one at each end of a twisted pair subscriber loop, with band splitters at each end to provide isolation between a high frequency spectrum (above 24 KHz) used for data transmission and lower frequencies (0–4 KHz) used for Plain Old Telephone Service (POTS) or Integrated Services Digital Network (ISDN) used in some applications. These modems use DMT technology to provide high data bandwidth and the ability to adapt the data rate at startup to match the transmission and noise characteristics of each individual subscriber loop. Each 4.3125 KHz band of the frequency spectrum (referred to as a Tone Bin), with center frequencies from 25.875 KHz (Tone Bin #6) to 1.04 MHz, is populated with a signal which may be considered to be a tone whose amplitude and phase are modulated to encode data bits. Tone Bins below 24 KHz (e.g., Tone Bins #1–#5) are not used for data transmissions.

Proposals have been made by various companies to define an alternate spectral assignment for Asymmetric Digital Subscriber Line (ADSL) Discrete Multitone (DMT) modems that allow for the use of low frequencies (below 24 KHz) for additional data throughput. In existing classical ADSL systems, the lower frequencies including the 0–4 KHz voice band and approximately 20 KHz of guard band thereabove, are reserved for Plain Old Telephone Service (POTS) telephony voice and signaling transmissions in some applications. In these classical ADSL systems, the ADSL data transmissions are transmitted in frequency bands above 24 KHz (Tone Bin #6 and above) with the different transmissions separated by filters in central office and Customer Premises Equipment (CPE) splitters.

Recent interest in "splitterless" ADSL has generated an activity in trying to provide a dual modality for transmissions wherein a subscriber's line could be used either in the classical ADSL mode as described above, or in a data only mode. In the data only mode, the lower frequencies (0–24 KHz) would be used to carry additional DMT "tones" (Tone Bins #1–#5) modulated with additional data. Since the lower frequencies are transmitted preferentially by most telephone loops, these lower frequencies can add substantial throughput capability to the subscriber's line.

The recent focus has been on eliminating the band splitter, at least at the subscriber premises. This necessitates some reduction in data throughput, since data carrier amplitudes must be reduced to avoid interference to POTS voice generated by nonlinearities. Since the POTS phone impedance loads the subscriber loop, it reduces input amplitude and available spectral bandwidth to the data receivers. Alternatively, POTS filters may be installed on each POTS telephone to prevent the ADSL signal from reaching, or being adversely affected by, the telephone, whether on-hook or off-hook. Unfortunately, while these POTS filters will reduce, or substantially eliminate, the POTS signal interference and the need to reduce the ADSL signal amplitude, the filters may render one or two of the tones below Tone #6 unusable. This reduction in data bandwidth is viewed as an acceptable tradeoff to reduce the complexity of installation of the service by eliminating equipment rewiring to accommodate the splitters. Coincidentally, complexity of the modem is reduced due to the narrower bandwidth and the attendant reduced signal processing bandwidth.

It is desirable to provide dual modality for transmissions wherein a subscriber's line can be used either in the classical ADSL mode as described above, or in a data only mode while providing rapid mode switching between just ADSL service and combined ADSL and POTS service based on central office or subscriber events indicating voice call initiation.

SUMMARY OF THE INVENTION

The present invention is directed to apparatus using low spectrum selectively for both Asymmetric Digital Subscriber Line (ADSL) and Plain Old Telephone Service (POTS) service over a single subscriber loop by adding predetermined control messages to allow rapid mode switching between just ADSL service and combined ADSL and POTS service based on central office or subscriber events indicating voice call initiation.

Viewed from one aspect, the present invention is directed to apparatus for providing both Plain Old Telephone Service (POTS) and Asymmetric Digital Subscriber Line (ADSL) data service over a common subscriber loop providing a predetermined frequency spectrum for transmission purposes. The ADSL data service makes use of a multiplicity of quadrature modulated tones separated in frequency from one another across the predetermined frequency spectrum, and POTS makes use of only a portion of said predetermined frequency spectrum. The apparatus comprises means for using said portion of the predetermined frequency spectrum for POTS while a POTS call is in progress, and means for excluding ADSL data service from at least said portion of the predetermined frequency spectrum and reducing the number of tones while a POTS call is in progress, and expanding ADSL data service into said portion of the predetermined frequency spectrum and increasing the number of tones while a POTS call is not in progress.

Viewed from another aspect, the present invention is directed to apparatus for providing bidirectional Asymmetric Digital Subscriber Line (ADSL) data service and Plain Old Telephone Service (POTS) over a subscriber loop. The apparatus comprises an ADSL transceiver and a control processor located in a local communication center. The ADSL transceiver receives ADSL data in a first direction from a remote source and loads the received ADSL data into predetermined tone bins for transmission over the subscriber loop to subscriber data equipment. The ADSL transceiver receives also ADSL data in a second direction in the predetermined tone bins from the subscriber loop for processing the ADSL data for transmission to the remote source. The control processor is responsive to a detection of an origination of a POTS call for generating a first control signal that causes the ADSL transceiver to load ADSL data into tone bins which are only in a frequency band above a predetermined frequency band used for a POTS call for data transmissions over the subscriber loop. The control processor is responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop.

Viewed from still another aspect, the present invention is directed to apparatus for implementing bidirectional Asymmetric Digital Subscriber Line (ADSL) data service and Plain Old Telephone Service (POTS) over a subscriber loop. The apparatus comprises an integrated line circuit which comprises detecting and processing circuitry, an ADSL transceiver, and a control processor. The detecting and processing circuitry detects an origination or termination of a POTS call directed to or from a subscriber coupled to the subscriber loop, and bidirectionally processes the POTS call for transmission between a remote source and the subscriber loop. The ADSL transceiver receives ADSL data from a remote source and loads the received ADSL data into predetermined tone bins for ADSL data transmissions over the subscriber loop to subscriber data equipment. The ADSL transceiver also receives ADSL data from the subscriber loop in the predetermined tone bins for processing the ADSL data for data retransmissions to the remote source. The control processor is responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop. The control processor is also responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop.

The invention will be better understood from the following more detailed description taken with the accompanying drawings and claims.

DETAILED DESCRIPTION

The present invention is directed apparatus for implementing "Splitterless" Asymmetric Digital Subscriber Line (ADSL) service (elimination of band splitters in modems) wherein integrated central office line circuits (ILCs) perform both Plain Old Telephone Service (POTS) and ADSL data service interfaces over a subscriber's loop. In accordance with the present invention, a single control entity located in the ILC, hereinafter also referred to as an ADSL Termination Unit-Central Office (ATU-C) modem, has full access to both of the POTS signaling state and the ADSL data interface. Similarly, an ADSL Termination Unit-Residential (ATU-R) modem is located at the subscriber end of the loop which is a Customer Premises Equipment (CPE) ADSL modem that has full visibility to analog parameters of the subscriber's loop. The analog parameters can be used to sense the presence of either a POTS telephone in an off-hook state or a reception of a POTS call at the central office destined for that POTS telephone.

The present invention takes advantage of the available information (e.g., telephone on-hook or off-hook state, or ringing) to dynamically and rapidly modify the ADSL data modem configurations at the central office and the subscriber premises to populate five low tone bins (Tones #1–#5 found in separate frequency bands below 24 KHz) with ADSL data only when POTS service is inactive (i.e., telephone is on-hook or no call is received for termination at that telephone at the central office). The actual tone center frequencies, as defined by T1E1.4/98-007R1 are: Tone Bin 1=4.3125 KHz, Tone Bin 2=8.625 KHz, Tone Bin 3=12.9375 KHz, Tone Bin 4=17.25 KHz, and Tone Bin 5=21.5625 KHz. More particularly, the present invention provides the sensing, control logic, and ADSL inter-modem communication functions necessary to allow dynamic reconfiguration of both the ADSL Termination Unit-Central Office (ATU-C) modem and the ADSL Termination Unit-Residential (ATU-R) modem in response to a POTS call that is either initiated by the subscriber coupled to the ATU-R, or received at the central office ATU-C for that subscriber from a connected communication system.

Figure 1:
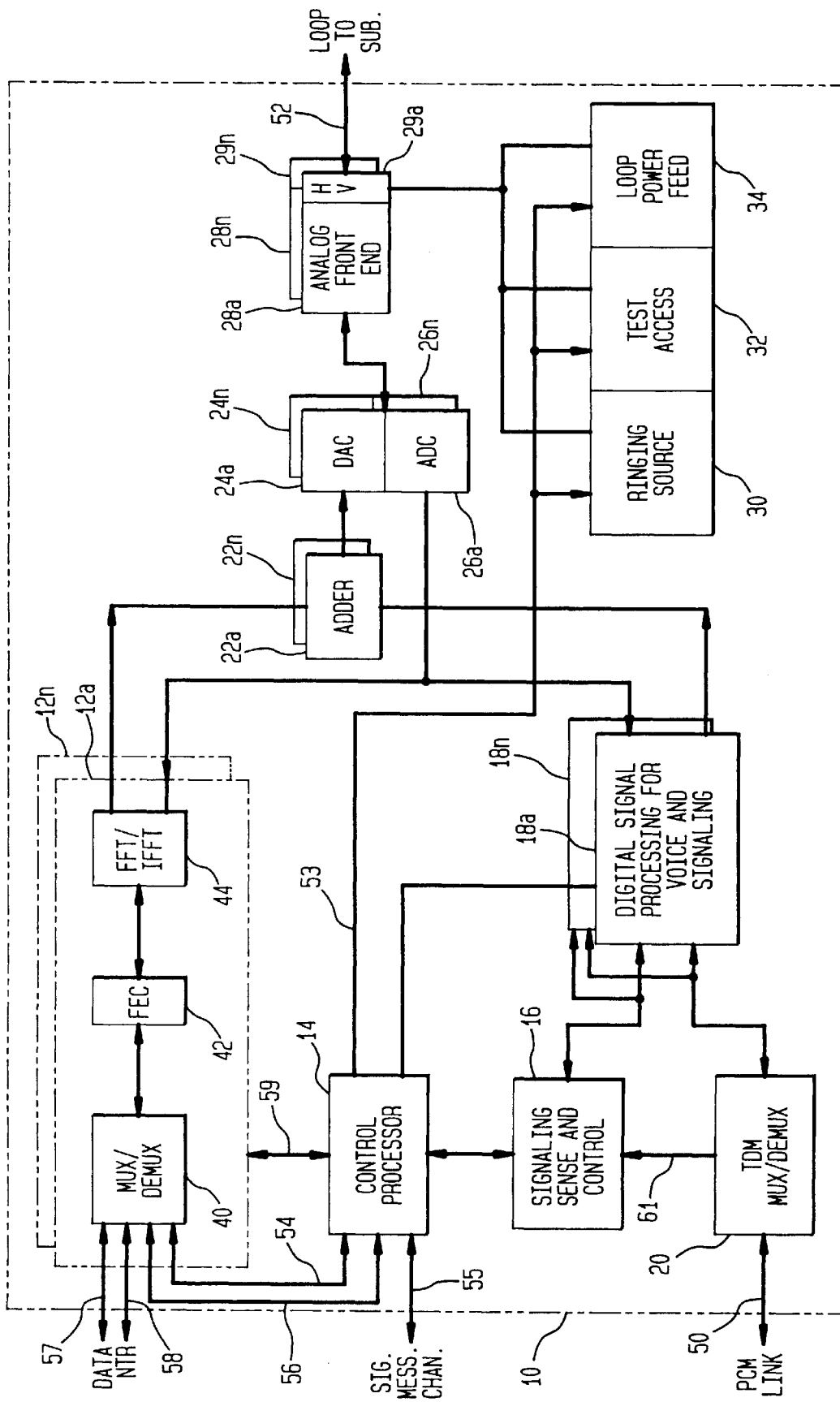
FIG. 1 shows a block diagram of an integrated line card for use in a central office in accordance with the present invention.

Referring now to FIG. 1, there is shown a block diagram of an integrated line card (ILC) 10 (shown within a dashed line rectangle) that is located, for example, in a central office or local communication center (e.g., a Private Branch Exchange) in accordance with the present invention. The ILC 10 generally terminates multiple subscriber loops (of which only subscriber loop 52 is shown), each of which may independently require either POTS or ADSL service, or both. The integrated line card 10 comprises a plurality of ADSL transceivers 12a–12n (shown within separate dashed line rectangles with only 12a and 12n expressly shown), a Control Processor 14, a Signaling Sense and Control circuits 16, a plurality of Digital Signal Processing for Voice and Signaling circuits 18a–18n (shown within separate rectangles with only 18a and 18n expressly shown), a Time Division Multiplex Multiplexer/Demultiplexer (TDM MUX/DEMUX) circuit 20, a plurality of adders 22a–22n (shown within separate rectangles with only 22a and 22n expressly shown), a plurality of Digital to Analog Conversion (DAC) circuits 24a–24n (shown within separate rectangles with only 24a and 24n expressly shown), a plurality of Analog to Digital Conversion (ADC) circuits 26a–26n (shown within separate rectangles with only 26a and 26n expressly shown), a plurality of analog front end circuits 28a–28n (shown within separate rectangles with only 28a and 28n expressly shown) including a corresponding plurality of High Voltage (HV) circuits 29a–29n (with only 29a and 29n expressly shown), a ringing source 30, a test access circuit 32, and a loop power feed circuit 34. It is to be understood that interconnections between elements of the integrated line card 10 are only shown for the associated first elements (e.g., 12a, 18a, 22a, 24a, 26a, 28a, and 29a) of each of the indicated plurality of n elements for simplicity purposes only, and that each of the other corresponding associated n–1 elements are interconnected and function in a same manner as is described hereinafter for the associated first elements.

Each of the plurality of ADSL transceivers 12a–12n comprises a serial coupling of a Multiplexer/Demultiplexer (MUX/DEMUX) 40, a Forward Error Correction (FEC) circuit 42, and a Fast Fourier Transform/Inverse Fast Fourier Transform (FFT/IFFT) circuit 44. The combination of these three elements 40, 42, and 44 operates on ADSL data bidirectionally propagating between a data line 57 and an associated subscriber loop (e.g., loop 52). In the ADSL transceiver 12a, a first (upstream) side of the MUX/DEMUX 40 is coupled to bidirectionally communicate ADSL data over data line 57, and Network Timing Reference signals (NTR) over lead 58 with an upstream remote source (not shown) of a communication system. The MUX/DEMUX 40 also selectively transmits and receives both a set of function specific control bits [hereinafter referred to indicator bits (ib)] over lead 54, and control signals indicating an embedded operation channel (eoc) and an ADSL operations channel (aoc) over lead 56 to and from the Control Processor 14. The eoc and aoc channels are transported across the subscriber loop 52 as overhead in the multiplex with user data and indicator bits, and provide a bidirectional communication channel between the Control Processors 14 and 114 at the local exchange and the subscriber premises, respectively. A second (downstream) side of the MUX/DEMUX 40 is coupled for bidirectional transmissions to a first side of the FEC 42. A second side of the FEC 42 is coupled for bidirectional transmissions to a first side of the FFT/IFFT 44. A second side of the FFT/IFFT 44 is coupled to transmit resulting ADSL data signals to the adder 22a, and to receive signals from the subscriber loop 52 via the analog front end circuit 28a and the ADC circuit 26a. The ADSL transceiver 12a also receives control signals from the Control Processor 14 via a control bus 59 for selectively controlling all aspects of the ADSL transceiver 12a such as, for example, populating and depopulating tone bins with ADSL data.

The ADSL service is realized by a modem which is a combination of the transceivers 12a–12n and control functions provided by the Control Processor 14. For data signals received via lead 57, the transceiver (e.g., 12a), in addition to its modulation functions performed in the MUX/DEMUX 40 on the Data signals on lead 57, combines (a) the modulated user data stream on lead 57 with (b) two embedded operations channel (eoc) and ADSL operations channel (aoc) messages provided by the control processor 14 over lead 56, (c) Network timing reference signal (NTR) on lead 58, and (d) a set of function specific control bits referred to hereinafter as indicator bit 18 (ib 18) on lead 54 which is the bit number in an ADSL data signal transmitted over the subscriber loop (e.g., 52). These combined signals are used subsequently to create the analog signal for the high-frequency spectrum used for ADSL transmission on the loop 52. It is to be understood that in future implementations, a single Digital Signal Processor (DSP) (not shown) may perform the modem function (shown as performed by the ADSL Transceivers 12a–12n and the Control Processor 14) for multiple subscriber loops.

In operation, the MUX portion of the MUX/DEMUX 40 in the ADSL Transceiver 12a combines the various components of a single composite ADSL line signal received on leads 54, 56, 57 and 58 for transmission in the downstream direction to the subscriber loop 52, while the DEMUX portion separates the demodulated ADSL line signal to form the various components for transmission on leads 54, 56, 57, and 58 in the upstream direction from the subscriber loop 52. The FEC 42 performs the encoding and decoding forward-acting error correcting of the data bit streams received from the MUX 40 in the downstream direction and from the associated ADC 26a in the upstream direction. In the FFT/IFFT 44, the ADSL data signals are constructed by Inverse Fourier Transform techniques based on control signals from the Control Processor 14 via the control bus 59. Therefore, the composite digital ADSL data signals received by the transceiver 12a from the upstream remote source (not shown) via lead 57 are forward error corrected, then decomposed, and the bits are assigned to tone bins and encoded to a discrete multitone symbol by the IFFT portion of the FFT/IFFT 44 under control signals from the Control Processor 14 via the control bus 59. In the reverse direction, the ADSL data signals from the subscriber loop 52 are converted into a digital data signal by the FFT portion of the FFT/IFFT 44 before being forward error corrected in the FEC 42 and then demultiplexed in the MUX/DEMUX 40 to separate the user and control data streams onto their proper leads 54, 56, 57, and 58.

In the ILC 10, POTS service is provided between a Pulse Code Modulation (PCM) Link 50 and each of the associated subscriber loops (e.g., loop 52). For POTS service to multiple subscriber loops, the ILC 10 uses the Time Division Multiplex Multiplexer/Demultiplexer (TDM MUX/DEMUX) circuit 20, the plurality of Digital Signal Processing for Voice and Signaling circuits 18a–18n, and the Signaling Sense and Control circuit 16. The PCM Link 50 is coupled to the TDM MUX/DEMUX circuit 20, and the TDM MUX/DEMUX circuit 20 is coupled to the plurality of Digital Signal Processing for Voice and Signaling Circuits 18a–18n, and to the Signaling Sense and Control circuit 16. Each of the plurality of Digital Signal Processing for Voice and Signaling Circuits 18a–18n is coupled to the Control Processor 14, the Signaling Sense and Control circuits 16, a corresponding one of the plurality of adders 22a–22n for transmitting POTS calls to the associated subscriber loop (e.g. loop 52), and a corresponding one of the plurality of ADC circuits 26a–26n for receiving POTS calls and signaling messages from the associated subscriber loop.

For POTS operation, the TDM MUX/DEMUX circuit 20 receives PCM channel signals and channel associated signaling bits from the PCM link 50, and demultiplexes the PCM channel signals for an associated subscriber loop (e.g., loop 52). The demultiplexed PCM channel signals are transmitted to the associated one of the Digital Signal Processing for Voice and Signaling circuits 18a–18n. The associated signaling bits are transmitted to the Signaling Sense and Control circuit 16 via lead 61 where they are stored for use by the Control Processor 14 to initiate subscriber loop events such as ringing, etc. In the reverse direction, the TDM MUX/DEMUX circuit 20 receives the PCM channel signals from the plurality of the Digital Signal Processing for Voice and Signaling circuits 18a–18n provided by the associated subscriber loop (e.g., loop 52), and time division multiplexes the PCM channel signals into their proper time slots for transmission on the PCM link 50 to the upstream remote source (not shown). The Digital Signal Processing for Voice and Signaling circuits 18a–18n provides anti-alias filtering, code law computation, gain adjustment, hybrid impedance match, ringing generation, loop state detection, and other analog-loop related functions by performing computations on the digital representation of the subscriber loop signals flowing in both directions. Detected subscriber loop signaling state information is passed to the Signaling Sense and Control circuit 16, and in the reverse direction transmitted loop state information is received from the Signaling Sense and Control circuit 16. In some implementations, where necessary, the Digital Signal Processing for Voice and Signaling circuits 18a–18n may also perform additional digital filtering functions. In a fully integrated implementation, the digital filtering functions will be performed by the same Digital Signal Processing for Voice and Signaling circuit (e.g., 18a) that performs the ADSL transceiver functions, and will include POTS/ADSL band separation filters (not shown).

The Control Processor 14 controls all aspects of both the ADSL and POTS operations for multiple subscriber loops (e.g., loop 52). The Control Processor 14 receives status signals from, and transmits control signals to, both of the ADSL transceivers 12a–12n and the POTS Digital Signal Processing for Voice and Signaling circuits 18a–18n via the Signaling Sense and Control circuit 16. The Control Processor 14 also monitors ADSL transmissions and adjusts bit loading via control signals on lead 59, and transmits levels in response to detected variations in the ADSL line transport capacity via control signals on lead 59. Still further, the Control Processor maintains the status of ADSL line maintenance information blocks (MIBs) and communicates with the associated ATU-R at opposite end of the associated subscriber's loop via the eoc, aoc, and ib signals sent to the ADSL transceiver (e.g., 12a) associated with that ATU-R via lines 54 and 56. The Control Processor 14 further bidirectionally communicates with data network management entities at the upstream remote source (not shown) via a signaling message channel 55. The Control Processor 14 also interprets received POTS subscriber loop signaling states (on-hook, off-hook), sets POTS loop states (ringing, current feed, etc.), and controls loop test access via control messages sent over lead 53. These control messages are based on communications had with a POTS switch (not shown) at the upstream remote source via the signaling message channel 55 or via channel associated (CAS) signaling bits carried in the PCM time slots for each channel as received via PCM link 50 and directed to the Signaling Sense and Control circuit 16 via lead 61. The above described functioning of the Control Processor 14, with respect to ADSL, comprises standard functions as suggested in the ADSL Standards Document T1E1.4/98-007R1 entitled "Standards Project for Interfaces Relating to Carrier to Customer Connection of Asymmetrical Digital Subscriber Line (ADSL) Equipment"—T1.413 Issue 2, Sep. 26, 1997, and subsequent revisions edited by Bingham and Van der Putten. The above-described functioning of the Control Processor 14 with respect to POTS is considered prior art as would be found in existing line controllers of TDM digital switching equipment as found in, for example, Siemens EWSD and DCO line controllers.

The present invention adds a new function to the Control Processor 14 to couple the detection of POTS subscriber loop on-hook and off-hook state changes to accordingly populate (for the on-hook state) and depopulate (for the off-hook state) the tones #1–#5 in the 0–24 KHz frequency band between the subscriber's ATU-R modem (shown in FIG. 2) and the associated ADSL transceiver (e.g., 12a). In operation, the Control Processor 14 receives a control signal via the Digital Signal Processing for Voice and Signaling circuits 18a–18n and the Signaling Sense and Control circuit 16 indicating any change in the hook state of the associated subscriber loop, and in response to a change in hook state to send an appropriate hook state control signal (logical 0 or 1) in indicator bit 18 (ib 18) to the associated ATU-R at the subscriber's end. Concurrent therewith, the Control Processor 14 adjusts both the bit loading and the transmit amplitude of the tones #1–#5, and the resulting data mapping to transport additional data bits in the additional 0–24 KHz bandwidth, via control signals on the control bus 59.

Each of the plurality of Adders 22a–22n receives (a) the processed ADSL data signals (tones 1-up or tones 6-up, depending one whether the associated subscriber is on-hook or off-hook, respectively) from the associated one of the ADSL transceivers 12a–12n, and (b) the processed POTS signals from the associated one of the Digital Signal Processing for Voice and Signaling circuits 18a–18n, and adds the two signals to form a combined subscriber output signal. Each of the adders 22a–22n transmits the combined subscriber output signal to the one of the plurality of DACs 24a–24n associated with that subscriber. While adders 22a–22n are shown in FIG. 1 as separate adders for each subscriber loop, highly integrated implementations can be made to perform this function in a common Digital Signal Processing for Voice and Signaling circuit (e.g., 18a) which may additionally be shared over multiple subscriber loops. Each of the DACs 24a–24n converts the received digital combined subscriber output signal into a corresponding analog subscriber output signal for transmission to the corresponding one of the plurality of analog front end circuits 28a–28n associated with that subscriber.

Each of the plurality of analog front end circuits 28a–28n provides for gain and impedance matching for transmitting the analog combined subscriber output signal on the associated subscriber loop (e.g., 52) in a downstream direction, and for reception of a combined subscriber signal from the associated subscriber loop (e.g., 52) in an upstream direction. Each of the High Voltage sections 29a 29n, forming part of a corresponding one of the plurality of analog front end circuits 28a–28n, isolates the associated analog front end circuit 28 from high voltages used for ringing and loop power feed as provided by the Ringing source 30 and the Loop Power Feed 34, respectively. More particularly, the Ringing source 30 provides a ringing signal to the subscriber when a POTS call is directed to the subscriber (when the subscriber is the called party). Alternatively, in balanced ringing applications, the ringing signal may be generated by the corresponding Digital Signal Processor for Voice and Signaling circuit 18a–18n, and carried through the same path as the voice signals. The Test Access 32 provides metallic switching to connect the subscriber loop (e.g., loop 52) to a remote test console (not shown) where a technician supervises testing for loop failures. The Loop Power Feed 34 provides a connection to the central office battery (not shown) to power the subscriber loop (e.g., loop 52). This power is used both to power telephone sets and to enable loop current flow as a means of the detection of the hook state.

Figure 2:
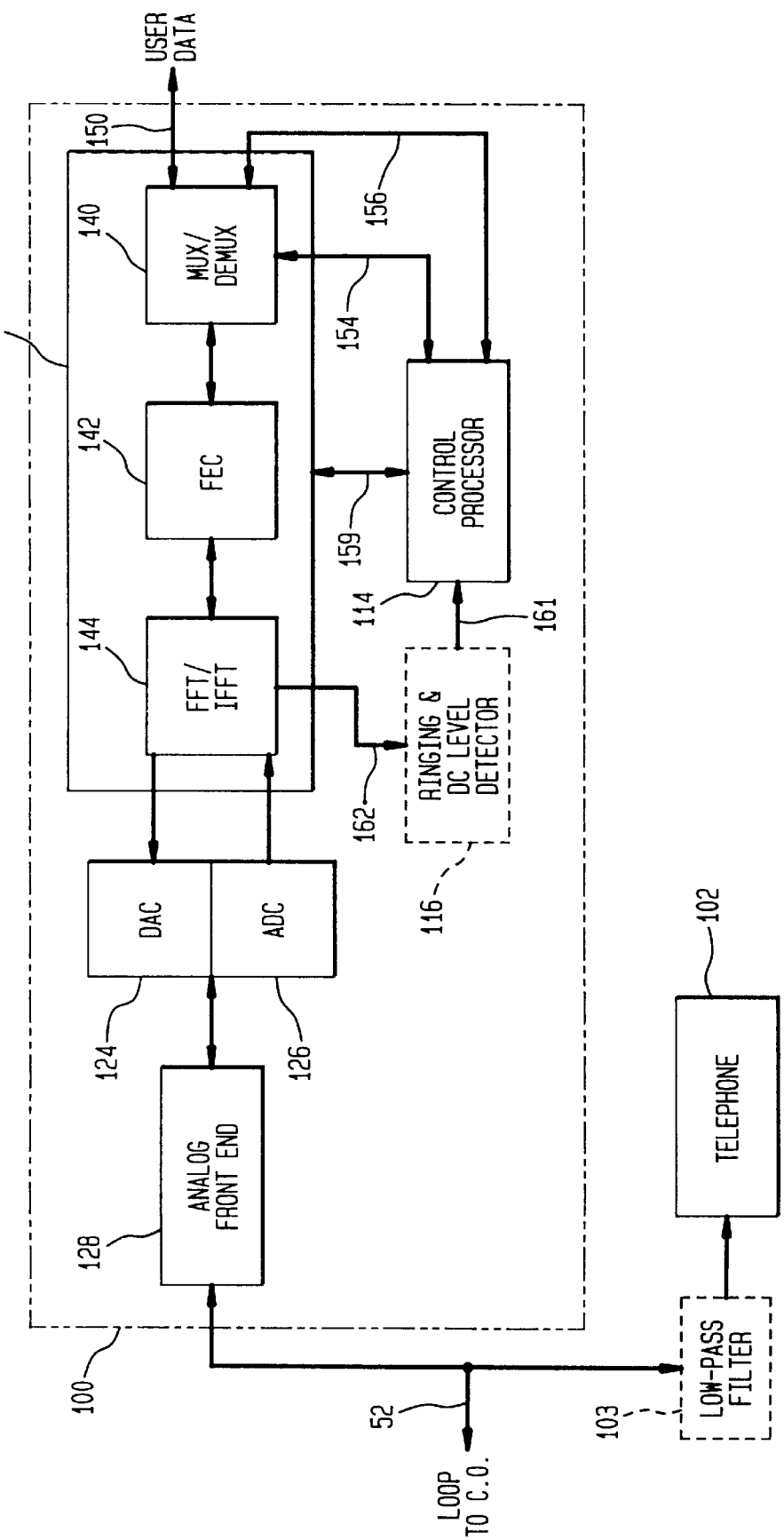
FIG. 2 shows a block diagram of a subscriber modem in accordance with the present invention.

Referring now to FIG. 2, there is shown a block diagram of a Asymmetric Digital Subscriber Line (ADSL) Termination Unit-Residential (ATU-R) modem 100 (shown within a dashed-line rectangle) and a telephone 102 together with an optional low pass filter 103 (shown within a dashed line rectangle) that are coupled to a subscriber loop 52 in accordance with the present invention. The modem 100 comprises an ADSL transceiver 112 (shown within a dashed-line rectangle), a Control Processor 114, a Digital to Analog Conversion (DAC) circuit 124, an Analog to Digital Conversion (ADC) circuit 126, and an analog front end circuit 128. The ADSL transceiver 112 comprises a serial coupling of a Multiplexer/Demultiplexer (MUX/DEMUX) 140, a Forward Error Correction (FEC) circuit 142, and an Fast Fourier Transform/Inverse Fast Fourier Transform (FFT/IFFT) circuit 144 between a subscriber's data line 150, which is coupled to a subscriber data terminal (not shown), and the associated subscriber loop 52. The combination of circuits 140, 142, and 144 operates on the ADSL data propagating to or from the associated subscriber loop 52. It is to be understood that the elements 112, 114, 124, 126, 128, 140, 142, and 144 operate on ADSL data in a similar manner to that described hereinbefore for the elements 12, 14, 24, 26, 28, 40, 42, and 44 in the Integrated central office Line Circuit (ILC) 10 of FIG. 1. A telephone 102, or other communication device used by the subscriber for POTS calls is coupled to the subscriber loop 52. Also shown is an optional low pass filter 103, which may be required in some applications for optimum functioning of the ADSL and POTS services. The low pass filter 103 isolates the subscriber loop 52 from both loading and possible nonlinear responses due to some POTS telephones, thus improving the throughput and channel robustness for the ADSL modems 100. Both low pass filter 103 and distributed splitters are suggested for this function in the ADSL literature, and both enhance the operation of the present invention by insuring that the control messages for insertion and removal of data in the low tones flow without interruption of the ADSL transmission. If the distributed configuration is used, the high-pass input filter characteristic of the analog front end 128 at the ATU-R must be dynamically modified to pass the low tones when they are used for data.

In operation, the MUX portion of the MUX/DEMUX 140 combines the various signal components received on leads 150, 154, 156, and 159 for generating a single composite ADSL line output signal for subsequent transmission on the subscriber loop 52. The DEMUX portion separates the demodulated ADSL line signal received from the subscriber loop 52 to form the various signal components for transmission on leads 150, 154, 156, and 159. An indicator bit (e.g., ib 18) for propagation on lead 154 is one of these components. The FEC 142 performs the encoding and decoding forward-acting error correcting of the data bit streams received from the MUX 140 and the ADC 126, respectively, of the associated data channel in the transceiver 112. In the FFT/IFFT 144, the ADSL data signals are constructed by Inverse Fourier Transform techniques. Therefore, the composite digital ADSL data signals received from the subscriber over lead 150 by the transceiver 112 is forward error corrected, then decomposed, and the bits are assigned to tone bins and encoded into a discrete multitone symbol by the IFFT portion of the FFT/IFFT 144 prior to being converted to an analog data signal in the Digital to Analog Conversion (ADC) circuit 126. In the reverse direction, the ADSL data signal from the subscriber loop 52 is converted into a digital data signal by the FFT portion of the FFT/IFFT 144 before being forward error corrected in the FEC 142 and then demultiplexed to separate the user and control data streams onto their proper leads 150, 154, 156, and 159. The DAC 124 converts the received digital subscriber's data signal into a corresponding analog signal for transmission to the analog front end circuit 128.

The analog front end circuit 128 provides for gain and impedance matching for transmitting the analog subscriber's data signal from the DAC 124 onto the associated subscriber loop 52, and for reception of a subscriber destined analog data signal from the associated subscriber loop 52. In an alternative implementation, the ADSL transceiver 100 may also include an optional Ringing and DC Level Detector 116 (shown within a dashed line rectangle) to analyze the DC and very low frequency spectrum of the received subscriber loop 52 signal, provided from the FFT 144 function via lead 162, to detect both ringing (normally at 25 or 50 Hz) and changes in the loop DC voltage drop due to current flow through the hookswitch of the POTS telephone 102. This provides autonomous detection, at the subscriber end of the loop 52, of the origination and termination of POTS calls. This combined detection may be used to signal POTS loop state changes to the Control Processor 114 on lead 161 in lieu of the hereinbefore defined signals received from the ATU-C of FIG. 1 via the ADSL composite signal and presented to the Control Processor 114 on leads 154 and/or 156. In this alternative implementation, precise time synchronization of events between the ATU-C and the ATU-R is provided by counting the Discrete Multitone (DMT) symbols flowing on the ADSL spectrum of the subscriber loop 52.

As was indicated hereinbefore, in the ILC 10 of FIG. 1, the Control Processor 14 receives the subscriber's loop hook state changes from the associated Digital Signal Processing for Voice and Signaling circuits 18a–18n via the Signaling Sense and Control circuit 16. The Control Processor 14 then sends an appropriate hook state message on indicator bit 18 (ib 18), or via an aoc message, to the associated ATU-R modem 100 (ATU-R) at the subscriber's end. The modem 100 of FIG. 2 receives such appropriate state of the indicator bit 18 or the aoc message, and the demultiplexer portion of the MUX/DEMUX 140 directs such indicator bit 18 via lead 154, or the aoc message via lead 156, to the control processor 114. The Control Processor 114 in the ATU-R modem 100 receives the hook state message from the MUX/DEMUX 140 via lead 154 or 156, and adjusts both the bit loading and the transmit amplitude of the tones #1–#5 and the resulting data mapping via a control bus 159 in order to transport additional data bits in the tone bins #1–#5 in the 0–24 KHz bandwidth. More particularly, the Control Processor 114 uses the detection of on-hook and off-hook state changes of the telephone 102 and the POTS subscriber loop 52 as indicated in the indicator bit 18 or the aoc message, to accordingly populate (for the on-hook state) and depopulate (for the off-hook state) user data to or from the subscriber's remote data terminal (not shown) which is connected to lead 150 to the tones #1–#5 in the 0–24 KHz frequency band from or to the associated ADSL transceiver (e.g., 12a) in the ILC 10 of FIG. 1.

For example, when the indicator bit 18 is used to contain the ATU-C sensed loop state at the ILC 10 of FIG. 1, then no energy will be transmitted in the low tone bins #1–#5 (the tone bins are depopulated) when the indicator bit is set to a logical "1", and the population of the low tone bins #1–#5 with data is enabled when the indicator bit is set to a logical "0". Similarly, if aoc hook state messages are used, an exemplary ⅗-majority vote on five separate repetitions of the message is recommended for detection of the POTS idle (on-hook) state to result in the population of data in tone bins #1–#5. Still further, an exemplary ⅔-majority vote should occur for the POTS-busy (off-hook) state detection and removal of data in the tone bins #1–#5. Such asymmetric detection voting favors protection of the POTS service over data capacity since robust operation without false transitions between services is assured. It is to be understood that any suitable logical values for the indicator bit (ib 18), or the majority vote values for providing the appropriate aoc hook state messages, can be used. However, it is preferable to use the indicator bit hook state message technique since the allowed time to remove tones from the voiceband (0–24 KHz) is limited, and there is always a possibility of a queue of aoc and eoc messages which could extend the response time to an unacceptable time period. In the aforementioned alternative implementation, the ATU-R autonomously populates and depopulates the aforementioned tone bins #1 to #5 in a similar manner based on locally detected state changes, and transmits an aoc message to the ATU-C indicating the time of change in tone use. Concurrently, the ATU-C populates and depopulates the aforementioned tone bins based on its own locally detected subscriber loop state information, as described hereinbefore, and transmits an aoc message indicating the time of change in tone use. Upon receipt of such aoc message, each unit (ATU-C and ATU-R) updates its receiver profile to accommodate the changed spectrum use.

Figure 3:
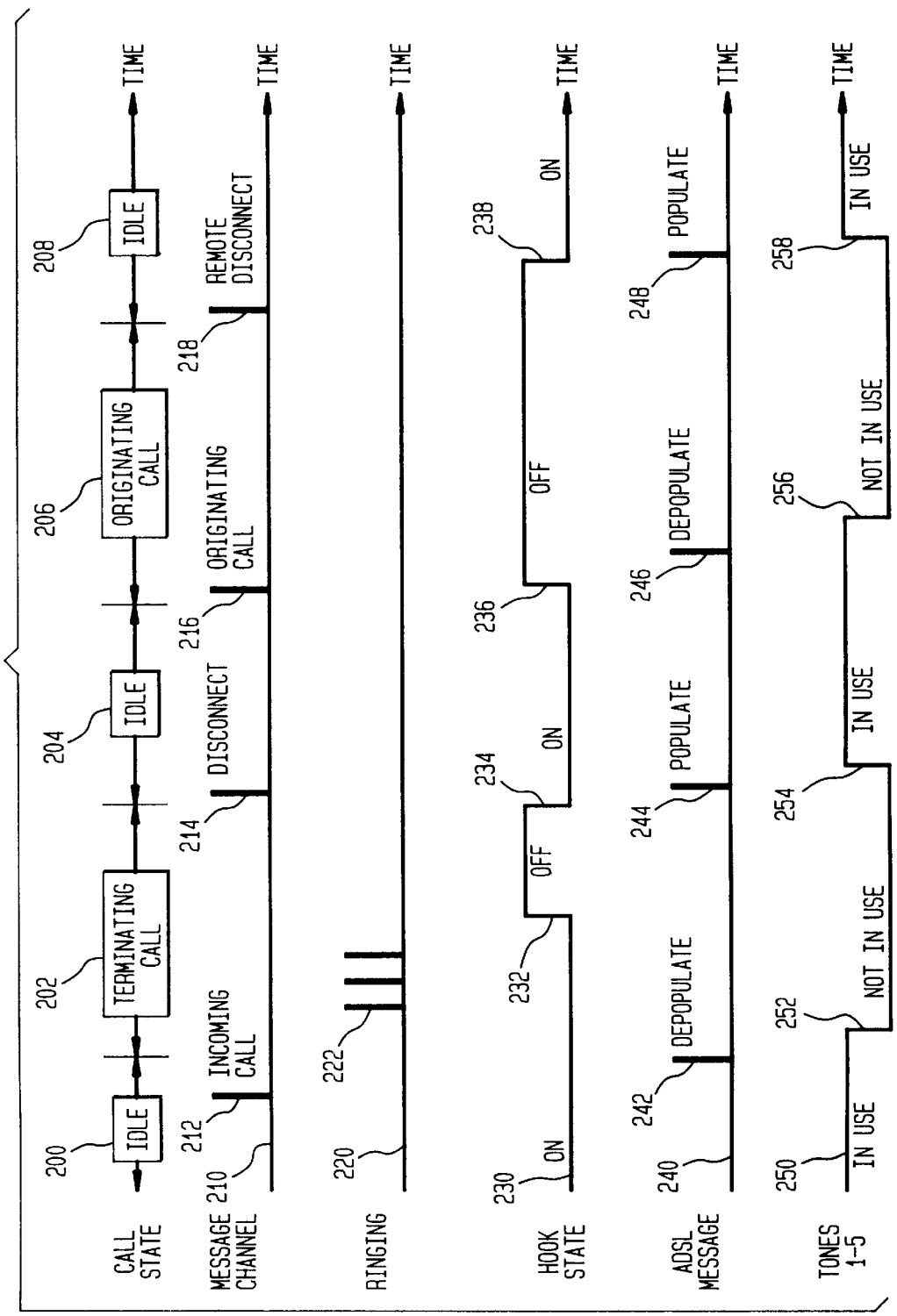
FIG. 3 is a timing diagram illustrating dual mode switching between a classical ADSL mode of transmission and a data only mode of transmission in a subscriber loop as provided by the integrated line card of FIG. 1 in accordance with the present invention.

Referring now to FIG. 3, there is shown a timing diagram illustrating dual mode switching between a classical Asymmetric Digital Subscriber Line (ADSL) and Plain Old Telephone Service (POTS) mode of transmission and an ADSL data only mode of transmission in a subscriber loop as provided by the Integrated Line Card (ILC) 10 of FIG. 1 in accordance with the present invention. The timing diagram illustrates call state activities 200, 202, 204, 206, and 208 versus time, and related message channel signals along axis 210, ringing signal activity along axis 220, hook state (on-hook, off-hook) activity along axis 230, ADSL message activity along axis 240, and the use activity of tones #1–#5 in the 0–24 KHz frequency band along axis 250 for each of the call states. During the idle call state 200, the hook state of the subscriber's telephone 102 (shown in FIG. 2) is shown as on-hook along axis 230, and the tones #1–#5 are in use with ADSL digital data as shown along axis 250. When an incoming call is indicated for termination at the subscriber's telephone 102 (the called party), an incoming call message channel signal 212 is received over the signal message channel 55 by the Control Processor 14 in the ILC 10 of FIG. 1. The Control Processor 14 transmits an ADSL "depopulate" message 242 via either indicator bit 18 or an aoc message signal to depopulate ADSL data being transmitted via the tones #1–#5 in the ADSL transceiver (e.g., 21a in FIG. 1) and in the ATU-R modem 100 (shown in FIG. 2). The ADSL data transmissions are shown as being depopulated at point 252 at or just before transmission of ringing signals 222 from the ringing source 30 (shown in FIG. 1) to the subscriber's telephone 102 (shown in FIG. 2) over the subscriber loop 52 (shown in FIGS. 1 and 2).

In response to the ringing signals 222, the subscriber picks up the telephone receiver and the telephone 102 goes off-hook at point 232 to complete the POTS call. When the call is concluded, the subscriber hangs up the telephone receiver at point 234, and an on-hook state occurs. The on-hook state is detected at the Signaling Sense and Control circuit 16 in FIG. 1, and a disconnect signal 214 is sent by the Control Processor 14 (shown in FIG. 1) via the signaling message channel 55 to the remote source in order to free this call from the remote source (not shown). The Control Processor 14 also sends a "populate" signal 244 via the indicator bit 18 or an aoc message to cause both the ADSL transceiver (e.g., 12a in FIG. 1) and the ATU-R modem 100 (shown in FIG. 2) associated with the subscriber's telephone 102 to again populate the tones #1–#5 with data at point 254.

When the subscriber originates a POTS call during a period 206, the telephone 102 goes to the off-hook state at point 236. The Signaling Sense and Control circuit 16 in FIG. 1 detects such off-hook state and informs the Control Processor 14 of FIG. 1 of such hook state change. The Control Processor 14 transmits both an originating call signal 216 via the signal message channel 55 to the remote source location, and a "depopulate" ADSL message signal 246 to the ADSL transceiver (e.g., 12a) and the ATU-R modem 100 of FIG. 2 associated with the subscriber originating the POTS call. At point 256 the tones #1–#5 are depopulated from carrying ADSL data and are available for the POTS call. Once the subscriber goes back on-hook at point 238 at the end of the POTS call an idle state 208 occurs, and the Signaling Sense and Control circuit 16 in FIG. 1 detects such on-hook state and informs the Control Processor 14 of FIG. 1 of such hook state change. The Control Processor 14 then sends both a "remote disconnect" signal 218 to the remote source location via lead 55, and a "populate" signal 248 to the ADSL transceiver (e.g., 12a) and the ATU-R modem 100 of FIG. 2 associated with the subscriber. At point 258 the tones #1–#5 are again populated with ADSL data.

Figure 4:
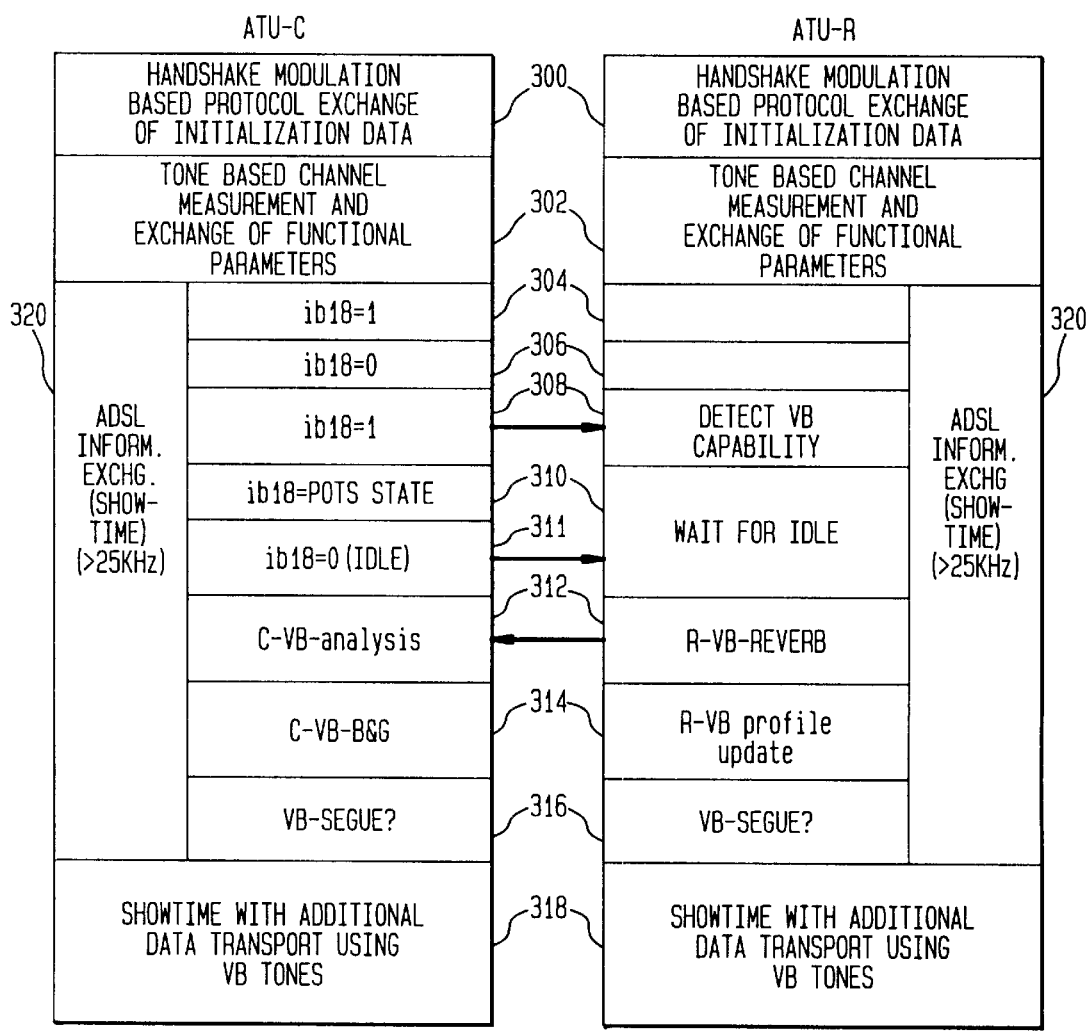
FIG. 4 is a flow diagram of an exemplary Voiceband Initialization sequence designated in a standards document for ADSL modems.

Referring now to FIG. 4, there is shown a flow diagram of exemplary extensions to the known ADSL Initialization as is described in Section 9 of T1E1.4/98-007R1 (cited hereinbefore) for ADSL modems which defines and provides details of such sequence information exchange. The Voiceband Initialization sequence extensions indicates steps taken at each of an ADSL Termination Unit-Central Office (ATU-C) modem (e.g., 12a and 14 shown in FIG. 1) forming part of the Integrated central office Line Circuits (ILC) 10 shown in FIG. 1, and an ADSL Termination Unit-Residential (ATU-R) modem 100 shown in FIG. 2. The Voiceband Initialization sequence includes both negotiation of voiceband tone capability and analysis of the low frequency spectrum (0–24 KHz) to set tone amplitude and data loading in the ATU-C and ATU-R. During this sequence, the high frequency spectrum (above 24 KHz) is used for normal ADSL data transmissions.

During a first interval 300, both the Control Processor 14 (shown in FIG. 1) and the Control Processor 114 (shown in FIG. 2) in the ATU-C and ATU-R, respectively, may perform handshake using a modulation based protocol exchange of predetermined initialization data. In interval 302, both the Control Processor 14 and the Control Processor 114 in the ATU-C and ATU-R, respectively, perform measurements of the loop transmission characteristics in the ADSL spectrum, as described in T1E1.4/98-007R1 and exchange functional parameters from the measurements that were made. During time period 320, the control processors 14 and 114 simultaneously perform both normal ADSL data exchange in the frequency band above 24 KHz and the extended initialization required for use of the frequency band below 24 KHz, as is shown in intervals 304, 306, 308, 310, 312, 314, and 316. During the intervals 304, 306, and 308, state transitions on the ib18 indicator bit are used to "advertise" the ATU's capability to support the use of the low spectrum. Upon detection of these state transitions, the ATU-R then waits for the ib18 information bit to indicate the idle state of the subscriber loop, and then transmits a composite signal, designated R-VB-REVERB, in all tones #1 through #5 in interval 312. Detection of this signal at the ATU-C provides both a confirmation of the ATU-R's capability to support the use of the low spectrum, and an opportunity to measure the transmission loss of the low spectrum channel on the subscriber loop. After analyzing the received signal, the ATU-C then sends the C-VB-B&G message in the aoc signal to the ATU-R in interval 314. The ATU-C uses this information to update its receiver profiles. In interval 316, both units (ATU-C and ATU-R) may optionally send a VB-Seque signal in the low spectrum. This signal would allow precise synchronization of the beginning of actual data flow using the added low spectrum capacity. Alternatively, the data flow could be made to begin a known time interval after the beginning of the R-VB-REVERB signal. During interval 320, a "Showtime" state is carried out where ADSL data is transmitted in tone bins #6 and up (above 25 KHz) between the ATU-C and ATU-R. "Showtime" is an operating state of a pair of ADSL modems, and is defined in the ADSL Standards Document T1E1.4/98-007R1 entitled "Standards Project for Interfaces Relating to Carrier to Customer Connection of Asymmetrical Digital Subscriber Line (ADSL) Equipment"—T1.413 Issue 2, Sep. 26, 1997, and subsequent revisions edited by Bingham and Van der Putten.

More particularly, in interval 304, the Control Processor 14 in the ATU-C sets the indicator bit 18 (ib 18) to a logical "1" which is normally sent to the associated ADSL transceiver (e.g., 12a shown in FIG. 1) on lead 54. Nothing occurs at the ATU-R during interval 304. In interval 306, the Control Processor 14 in the ATU-C sets the indicator bit 18 (ib 18) to a logical "0". Nothing occurs at the ATU-R during interval 306. In interval 308, the Control Processor 14 in the ATU-C again sets the indicator bit 18 (ib 18) to a logical "1" and sends this signal over the subscriber loop 52 to the Control Processor 114 in the ATU-R in an ADSL composite signal. Upon reception of the logical "1" signal in "ib 18", the Control Processor 114 in the ATU-R performs a detection of the ATU-C's resulting voiceband (VB) capability. In interval 310, the Control Processor in the ATU-C may, if the POTS state is busy, set the indicator bit 18 to define a Plain Old Telephone Service (POTS) busy state where the subscriber telephone 102 (shown in FIG. 2) is off-hook or a call is incoming to the telephone 102. In interval 311, the Control Processor transmits the POTS state (IDLE) wherein the indicator bit 18 is equal to a logical zero (ib 18=0) and defines the on-hook state, and transmits this signal to the Control Processor 114 in the ATU-C which is awaiting the signal for defining the Idle (on-hook) state (Wait for idle). In interval 312, the Control Processor 114 in the ATU-R transmits a Residence-Voice Band-Reverberation (R-VB-REVERB) signal, which is a defined signal and is shown capitalized, and transmits this signal via the subscriber loop 52 to the Control Processor 14 in the ATU-C. The R-VB-REVERB signal is defined as the extension to the 0–24 KHz spectrum of the normal R-REVERB-3,4,5 tones defined in T1E1.4/98-007R1 (cited hereinbefore). The R-VB-REVERB signal is a wideband pseudo-random signal used for estimation of the upstream Signal-To Noise Ratio (SNR) at the ATU-C. More particularly, this signal is defined herein as an arbitrary pseudo-random 12-bit sequence, 101000010010 applied in pairs as $d_n$, $d_{n+1}$ coefficients to the DC, Nyquist, and succeeding tone bins through $d_{10}$, $d_{11}$ applied to tone #5. The amplitude of each carrier is set to produce a spectral density of –38 dBm. Tones above the low spectrum carry user data during this interval. Note that any other pseudo-random sequence transmitted at known amplitude would work similarly. The Central Office Control Processor 14 performs a Voice Band-Analysis (C-VB-Analysis) which analyzes the voice band channel (0–24 KHz).

The analysis process produces a measurement of the signal amplitude and channel noise for each tone channel, which is then used by the Control Processor 14 to compute, for each tone channel, the optimum transmission amplitude. In interval 314, the Control Processor 14 in the ATU-C encodes and transmits this information to the ATU-R over the aoc channel, using a suitable encoding. An example encoding is an ordered sequence of 6 byte pairs wherein the first 4 bits of the first byte of a pair represent the bits to be encoded into that tone, $b_I$, and the remaining 12 bits represent the relative gain of that tone, $g_i$. Each $b_I$ shall be represented as an unsigned 4-bit integer, with valid $b_I$s lying in the range of zero to the maximum number of bits that the ATU-R is prepared to modulate onto any sub-carrier. Each $g_i$ shall be represented as an unsigned 12-bit fixed-point quantity, with the binary point assumed just to the right of the third most significant bit. For example, a $g_i$ with binary representation (most significant bit listed first) of 001, 010000000 would instruct the ATU-R to scale the constellation for carrier i, by a factor of 1.25, so that the power in that carrier shall be 1.94 dB higher than it was during R-VB-REVERB. The above encoding is modeled after the encoding suggested in the ADSL Standards Document T1E1.4/98-007R1 entitled "Standards Project for Interfaces Relating to Carrier to Customer Connection of Asymmetrical Digital Subscriber Line (ADSL) Equipment"—T1.413, Issue 2, Sep. 26, 1997, and subsequent revisions edited by Bingham and Van der Putten, with the exception that the encoded information is transmitted via the aoc channel rather than via a data message specific to the bits and gains function. The Bits and Gains measurement is a measurement of the channel to determine how many bits can be placed in each tone bin, and is considered as core information for populating tone bins.

In interval 314, the Control Processor 114 in the ATU-R performs a voiceband profile update (R-VB-Profile Update) based on information of channel measurements of a telephone on-hook voice channel received from the ATU-C, and stores a list of channel measurements in a profile table. More particularly, once the voice channel has been measured in the upstream direction at the Control Processor 14 in the ATU-C, ADSL operating channel (aoc) messages are transmitted in the downstream direction to the ATU-R by the Control Processor 14. The information stored in the profile table is based on these aoc messages. In interval 316, each of the ATU-C and ATU-R transmit a defined Segue signal (VB-SEGUE?) which is a broadband signal across the low tones #1–#5 that are going to be used. The Segue signal is the signal that causes a change from performing the Voiceband Initialization sequence to a "Showtime" state. The "Showtime" state is the operating state of a pair of ADSL modems (ATU-C and ATU-R), and is defined in the T1.413 and ITU standard cited hereinbefore. The Voiceband Initialization sequence provides a definition of a mandatory "pulse" on the ATU-C indicator bit #18 at the beginning of the Showtime state, and allows the ATU-R to know the state of the current POTS service.

In accordance with the present invention, the Control Processor 14 of FIG. 1 includes any suitable program (e.g., with a Look-Up Table) which will provide a first control message on lead 59 to the appropriate ADSL transceiver (e.g., 21a) to cause the FFT/IFFT 44 therein to populate tone bins #1–#5 in the 0–24 KHz frequency band during periods when no POTS service is occurring on an associated subscriber loop (e.g., 52). Still further, the suitable program in the Control Processor 14 would provide a second control message on lead 59 that causes the FFT/IFFT 44 to depopulate tone bins #1–#5 in the 0–24 KHz frequency band during periods when POTS service is occurring on the associated subscriber loop (e.g., 52). Additionally, the Control Processor 14 transmits a first control signal on either one of indicator bit #18 (logical 1 or 0) via lead 54, or an aoc message via lead 56, that causes the ATU-R modem 100 shown in FIG. 2 at the remote end of the subscriber loop 52 to populate the tone bins #1–#5 when POTS service is occurring on the associated subscriber loop 52. Alternatively, the Control Processor 14 transmits a second control signal on either one of indicator bit #18 (logical 0 or 1) via lead 54, or an aoc message via lead 56, that causes the ATU-R modem 100 shown in FIG. 2 at the remote end of the subscriber loop 52 to depopulate the tone bins #1–#5 when POTS service is occurring on the associated subscriber loop 52. The Control Processor 14 provides such above-mentioned control signals in response to control signals from the Signaling Sense and Control circuit 16 or the Signal Message Channel 55 indicating a change in the state of the POTS service to a predetermined subscriber.

It is to be appreciated and understood that the specific embodiments of the present invention described hereinabove are merely illustrative of the general principles of the invention. Various modifications may be made by those skilled in the art which are consistent with the principles set forth.

What is claimed is:

1. An apparatus for providing bidirectional Asymmetric Digital Subscriber Line (ADSL) data service and Plain Old Telephone Service (POTS) over a subscriber loop, comprising:

an ADSL transceiver located in a local communication center for receiving ADSL data in a first direction from a remote source and loading the received ADSL data into predetermined tone bins for transmission over the subscriber loop to subscriber data equipment, and for receiving ADSL data in a second direction in the predetermined tone bins from the subscriber loop for processing the ADSL data for transmission to the remote source; and a control processor responsive to a detection of an origination of a POTS call for generating a first control signal that causes the ADSL transceiver to load ADSL data into tone bins which are only in a frequency band above a predetermined frequency band used for a POTS call for data transmissions over the subscriber loop, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop, wherein the ADSL transceiver comprises a Fast Fourier Transform/Inverse Fast Fourier Transform (FFT/IFFT) circuit wherein the IFFT circuit is responsive to the first control signal from the control processor for loading ADSL data into the tone bins in the frequency band above the predetermined frequency band used for the POTS call for data transmissions over the subscriber loop, and is responsive to the second control signal from the control processor for loading ADSL data into the tone bins which are in both the predetermined frequency band used for the POTS call and the frequency band thereabove for data transmissions over the subscriber loop.

2. The apparatus of claim 1 wherein the FFT circuit of the FFT/IFFT is responsive to the first control signal from the control processor for unloading ADSL data from the tone bins received from the subscriber loop in only the frequency band above the predetermined frequency band used for the POTS call for data transmission to the remote source, and is responsive to the second control signal from the control processor for unloading ADSL data from the tone bins received from the subscriber loop which are in both the predetermined frequency band used for the POTS call and the frequency band thereabove for data transmission to the remote source.

3. An apparatus for providing bidirectional Asymmetric Digital Subscriber Line (ADSL) data service and Plain Old Telephone Service (POTS) over a subscriber loop, comprising:

an ADSL transceiver located in a local communication center for receiving ADSL data in a first direction from a remote source and loading the received ADSL data into predetermined tone bins for transmission over the subscriber loop to subscriber data equipment, and for receiving ADSL data in a second direction in the predetermined tone bins from the subscriber loop for processing the ADSL data for transmission to the remote source; and a control processor responsive to a detection of an origination of a POTS call for generating a first control signal that causes the ADSL transceiver to load ADSL data into tone bins which are only in a frequency band above a predetermined frequency band used for a POTS call for data transmissions over the subscriber loop, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop, wherein the control processor is responsive to a detection of an origination of a POTS call in the first or second direction over the subscriber loop for generating a third control signal which is transmitted as part of the ADSL data in the tone bins being transmitted over the subscriber loop to a subscriber modem at a subscriber end of the subscriber loop to cause the subscriber modem to load ADSL data into tone bins which are only above the predetermined frequency band used for the POTS call for data transmissions to the ADSL transceiver in the local communication center, and is responsive to a termination of a POTS call on the subscriber loop for generating a fourth control signal which is transmitted as part of the ADSL data in the tone bins over the subscriber loop to a subscriber modem to cause the subscriber modem to load ADSL data into tone bins which are in both the predetermined frequency band used for the POTS call and the frequency band thereabove for data transmissions to the ADSL transceiver in the local communication center.

4. The apparatus of claim 3 wherein the subscriber modem comprises:

an ADSL transceiver for receiving ADSL data and the third or fourth control signal from the ADSL transceiver in the local communication center and generating therefrom separate data output signals and a third or fourth control output signal; and a control processor responsive to the third control output signal from the subscriber modem ADSL transceiver for generating a fifth control signal that causes the subscriber modem ADSL transceiver to (a) unload the ADSL data received in the tone bins which are only in a frequency band above a frequency band used for a POTS call for data transmission to a subscriber data equipment, and (b) to load ADSL data from the subscriber data equipment into tone bins which are only in a frequency band above a frequency band used for a POTS call for data transmissions over the subscriber loop to the ADSL transceiver in the local communication center, and is responsive to the fourth output control signal received from the subscriber modem ADSL transceiver for generating a sixth control signal that causes the subscriber modem ADSL transceiver to (c) unload the ADSL data received in the tone bins which are in both the frequency band used for a POTS call and the frequency band thereabove for data transmissions to the subscriber data equipment, and (d) load ADSL data into tone bins which are in both the frequency band used for the POTS call transmissions and the frequency band thereabove for data transmissions over the subscriber loop to the ADSL transceiver in the local communication center.

5. An apparatus for providing bidirectional Asymmetric Digital Subscriber Line (ADSL) data service and Plain Old Telephone Service (POTS) over a subscriber loop, comprising:

an ADSL transceiver located in a local communication center for receiving ADSL data in a first direction from a remote source and loading the received ADSL data into predetermined tone bins for transmission over the subscriber loop to subscriber data equipment, and for receiving ADSL data in a second direction in the predetermined tone bins from the subscriber loop for processing the ADSL data for transmission to the remote source;

a control processor responsive to a detection of an origination of a POTS call for generating a first control signal that causes the ADSL transceiver to load ADSL data into tone bins which are only in a frequency band above a predetermined frequency band used for a POTS call for data transmissions over the subscriber loop, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop, a signaling processing for voice and signaling circuit for monitoring call states of a POTS call between the remote source and the subscriber loop and for generating output call state control signals corresponding to such call states; and a signaling sense and control circuit responsive to output control signals from the signaling processing for voice and signaling circuit and from a POTS line coupled to the remote source for storing current POTS call states, and for generating call state control signals to the control processor corresponding to the current POTS call states, whereby the control processor generates its first or second control signal based on the call state control signals received from the signaling sense and control circuit.

6. An apparatus for providing bidirectional Asymmetric Digital Subscriber Line (ADSL) data service and Plain Old Telephone Service (POTS) over a subscriber loop, comprising:

an ADSL transceiver located in a local communication center for receiving ADSL data in a first direction from a remote source and loading the received ADSL data into predetermined tone bins for transmission over the subscriber loop to subscriber data equipment, and for receiving ADSL data in a second direction in the predetermined tone bins from the subscriber loop for processing the ADSL data for transmission to the remote source;

a control processor responsive to a detection of an origination of a POTS call for generating a first control signal that causes the ADSL transceiver to load ADSL data into tone bins which are only in a frequency band above a predetermined frequency band used for a POTS call for data transmissions over the subscriber loop, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop; and a second ADSL transceiver located in a local communication center for receiving ADSL data in a first direction from a remote source and loading the received ADSL data into predetermined tone bins for data transmissions over a second subscriber loop to an associated second subscriber data equipment, and for receiving ADSL data in a second direction in the predetermined tone bins from the second subscriber loop for processing the ADSL data for transmission to the remote source, and wherein the control processor is responsive to a detection of an origination of a POTS call on the second subscriber loop for generating a first control signal that causes the second ADSL transceiver to load ADSL data into tone bins which are only in a frequency band that is above a predetermined frequency band used for a POTS call for data transmissions over the second subscriber loop, and is responsive to a detection of a termination of a POTS call on the second subscriber loop for generating a second control signal that causes the second ADSL transceiver to load ADSL data into tone bins which are in both the predetermined frequency band used for a POTS call and the frequency band thereabove for data transmissions over the second subscriber loop.

7. The apparatus of claim 6 wherein the control processor is responsive to a detection of an origination of a POTS call in the first or second direction over the second subscriber loop for generating a third control signal which is transmitted as part of the ADSL data in the tone bins being transmitted over the second subscriber loop to a second subscriber modem at a subscriber end of the second subscriber loop to cause the second subscriber modem to load ADSL data into tone bins which are only above the predetermined frequency band used for the POTS call for data transmissions to the second ADSL transceiver in the local communication center, and is responsive to a detection of a termination of a POTS call on the second subscriber loop for generating a fourth control signal which is transmitted as part of the ADSL data in the tone bins over the second subscriber loop to the second subscriber modem to cause the second subscriber modem to load ADSL data into tone bins which are in both the predetermined frequency band used for the POTS call and the frequency band thereabove for data transmissions to the second ADSL transceiver in the local communication center.

8. The apparatus of claim 7 wherein the second subscriber modem comprises:

an ADSL transceiver for receiving both ADSL data signals and the third or fourth control signal from the second ADSL transceiver in the local communication center and generating therefrom separate data output signals and the third or fourth control output signal; and a control processor responsive to the third control output signal from the second subscriber modem ADSL transceiver for generating a fifth control signal that causes the second subscriber modem ADSL transceiver to (a) unload the ADSL data received in the tone bins which are only in a frequency band above a frequency band used for a POTS call for data transmissions to the second subscriber data equipment, and (b) to load ADSL data from the second subscriber data equipment into tone bins which are only in a frequency band above a frequency band used for a POTS call for ADSL data transmissions over the second subscriber loop to the second ADSL transceiver in the local communication center, and is responsive to the fourth output control signal received from the second subscriber modem ADSL transceiver for generating a sixth control signal that causes the second subscriber modem ADSL transceiver to (c) unload the ADSL data received in the tone bins which are in both the frequency band used for a POTS call and the frequency band thereabove for data transmissions to the second subscriber data equipment, and (d) load ADSL data from the subscriber data equipment into tone bins which are in both the frequency band normally used for the POTS call transmissions and the frequency band thereabove for ADSL data transmissions over the second subscriber loop to the second ADSL transceiver in the local communication center.

9. An apparatus for providing bidirectional Asymmetric Digital Subscriber Line (ADSL) data service and Plain Old Telephone Service (POTS) over a subscriber loop, comprising:

an ADSL transceiver located in a local communication center for receiving ADSL data in a first direction from a remote source and loading the received ADSL data into predetermined tone bins for transmission over the subscriber loop to subscriber data equipment, and for receiving ADSL data in a second direction in the predetermined tone bins from the subscriber loop for processing the ADSL data for transmission to the remote source;

a control processor responsive to a detection of an origination of a POTS call for generating a first control signal that causes the ADSL transceiver to load ADSL data into tone bins which are only in a frequency band above a predetermined frequency band used for a POTS call for data transmissions over the subscriber loop, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop;

an ADSL transceiver located at a subscriber location for receiving ADSL data in a first direction over the subscriber loop from the ADSL transceiver in the local communication center and unloading the received ADSL data from predetermined tone bins for transmission over the subscriber loop to subscriber data equipment, and for receiving ADSL data in a second direction from the subscriber data equipment and loading the ADSL data into predetermined tone bins for transmission over the subscriber loop to the ADSL transceiver in the local communication center; and a control processor located at the subscriber location responsive to a detection of an origination of a POTS call for generating a first control signal that causes the ADSL transceiver to load ADSL data into tone bins which are only in a frequency band above a predetermined frequency band used for a POTS call for data transmission over the subscriber loop to the ADSL transceiver in the local communication center, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop to the ADSL transceiver in the local communication center.

10. The apparatus of claim 9 further comprising:

a ringing and DC level detector for detecting either one of a ringing signal on the subscriber loop or a DC level change on the subscriber loop indicating the initiation of POTS call for generating a first output control signal, and for detecting a termination of a POTS call at the subscriber location, for generating a second control output signal; and the control processor is responsive to the first control output signal from the ringing and DC level detector for generating the first control signal to the ADSL transceiver at a subscriber location, and is responsive to the second control output signal from the ringing and DC level detector for generating the second control signal to the ADSL transceiver at a subscriber location.

11. An apparatus for implementing bidirectional Asymmetric Digital Subscriber Line (ADSL) data service and Plain Old Telephone Service (POTS) over a subscriber loop comprising:

an integrated line circuit (ILC) located in a local communication center comprising:

detecting and processing circuitry for detecting an origination or termination of a POTS call directed to or from a subscriber coupled to the subscriber loop, and for bidirectionally processing the POTS call for transmission between a remote source and the subscriber loop;

an ADSL transceiver for receiving ADSL data in a first direction from a remote source and loading the received ADSL data into predetermined tone bins for data transmissions over the subscriber loop to subscriber data equipment, and for receiving ADSL data in a second direction in the predetermined tone bins from the subscriber loop for processing the ADSL data for data transmission to the remote source; and a control processor responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop, and responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop, wherein the ADSL transceiver comprises a Fast Fourier Transform/Inverse Fast Fourier Transform (FFT/IFFT) circuit wherein the IFFT circuit is responsive to the first control signal from the control processor for loading ADSL data into the tone bins in the frequency band above the predetermined frequency band used for the POTS call for ADSL data transmissions over the subscriber loop, and is responsive to the second control signal from the control processor for loading ADSL data into the tone bins which are in both the predetermined frequency band used for the POTS call and the frequency band thereabove for ADSL data transmissions over the subscriber loop.

12. The apparatus of claim 11 wherein the FFT circuit of the FFT/IFFT circuit is responsive to the first control signal from the control processor for unloading ADSL data from the tone bins received from the subscriber loop in only the frequency band above the predetermined frequency band used for the POTS call for data transmissions to the remote source, and is responsive to the second control signal from the control processor for unloading ADSL data from the tone bins received from the subscriber loop which are in both the predetermined frequency band used for the POTS call and the frequency band thereabove for data transmissions to the remote source.

13. An apparatus for implementing bidirectional Asymmetric Digital Subscriber Line (ADSL) data service and Plain Old Telephone Service (POTS) over a subscriber loop comprising:

an integrated line circuit (ILC) located in a local communication center comprising:

detecting and processing circuitry for detecting an origination or termination of a POTS call directed to or from a subscriber coupled to the subscriber loop, and for bidirectionally processing the POTS call for transmission between a remote source and the subscriber loop;

an ADSL transceiver for receiving ADSL data in a first direction from a remote source and loading the received ADSL data into predetermined tone bins for data transmissions over the subscriber loop to subscriber data equipment, and for receiving ADSL data in a second direction in the predetermined tone bins from the subscriber loop for processing the ADSL data for data transmission to the remote source; and a control processor responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop, and responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop, wherein the control processor is responsive to an origination of a POTS call in the first or second direction over the subscriber loop for generating a third control signal which is transmitted as part of the ADSL data in the tone bins being transmitted over the subscriber loop to a subscriber modem at a subscriber end of the subscriber loop to cause the subscriber modem to load ADSL data into tone bins which are in the frequency band above the predetermined frequency band used for the POTS call for ADSL data transmissions over the subscriber loop, and is responsive to a termination of a POTS call on the subscriber loop for generating a fourth control signal which is transmitted as part of the ADSL data in the tone bins over the subscriber loop to the subscriber modem to cause the subscriber modem to load ADSL data into tone bins which are in both the predetermined frequency band used for the POTS call and the frequency band thereabove for ADSL data transmissions over the subscriber loop.

14. The apparatus of claim 13 wherein the subscriber modem comprises:

an ADSL transceiver for receiving both ADSL data signals and the third or fourth control signal from the ADSL transceiver in the local communication center and generating therefrom separate data output signals and third or fourth control output signals; and a control processor responsive to the third control output signal from the subscriber modem ADSL transceiver for generating a fifth control signal that causes the subscriber modem ADSL transceiver to (a) unload the ADSL data received in the tone bins which are only in a frequency band above a frequency band used for a POTS call for data transmissions to a subscriber data equipment, and (b) to load ADSL data from the subscriber data equipment into tone bins which are only in a frequency band above a frequency band used for a POTS call for ADSL data transmissions over the subscriber loop to the ADSL transceiver in the local communication center, and is responsive to the fourth output control signal received from the subscriber modem ADSL transceiver for generating a sixth control signal that causes the subscriber modem ADSL transceiver to (c) unload the ADSL data received in the tone bins which are in both the frequency band for a POTS call and the frequency band thereabove for data transmissions to the subscriber data equipment, and (d) load ADSL data into tone bins which are in both the frequency band normally used for the POTS call and the frequency band thereabove for ADSL data transmissions over the subscriber loop to the ADSL transceiver in the local communication center.

15. An apparatus for implementing bidirectional Asymmetric Digital Subscriber Line (ADSL) data service and Plain Old Telephone Service (POTS) over a subscriber loop comprising:

an integrated line circuit (ILC) located in a local communication center comprising:

detecting and processing circuitry for detecting an origination or termination of a POTS call directed to or from a subscriber coupled to the subscriber loop, and for bidirectionally processing the POTS call for transmission between a remote source and the subscriber loop;

an ADSL transceiver for receiving ADSL data in a first direction from a remote source and loading the received ADSL data into predetermined tone bins for data transmissions over the subscriber loop to subscriber data equipment, and for receiving ADSL data in a second direction in the predetermined tone bins from the subscriber loop for processing the ADSL data for data transmission to the remote source; and a control processor responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop, and responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop, wherein the detecting and processing circuitry comprises:

a signaling processing for voice and signaling circuit for monitoring call states of a POTS call between the remote source and the subscriber loop and for generating call state output control signals corresponding to such call states; and a signaling sense and control circuit responsive to call state output control signals from the signaling processing for voice and signaling circuit and call state signals received from a POTS line coupled to the remote source for storing current POTS call states, for generating control signals to the control processor corresponding to the current POTS call states, whereby the control processor generates its first or second control signal based on the control signals from the signaling sense and control circuit.

16. An apparatus for implementing bidirectional Asymmetric Digital Subscriber Line (ADSL) data service and Plain Old Telephone Service (POTS) over a subscriber loop comprising:

an integrated line circuit (ILC) located in a local communication center comprising:

detecting and processing circuitry for detecting an origination or termination of a POTS call directed to or from a subscriber coupled to the subscriber loop, and for bidirectionally processing the POTS call for transmission between a remote source and the subscriber loop;

an ADSL transceiver for receiving ADSL data in a first direction from a remote source and loading the received ADSL data into predetermined tone bins for data transmissions over the subscriber loop to subscriber data equipment, and for receiving ADSL data in a second direction in the predetermined tone bins from the subscriber loop for processing the ADSL data for data transmission to the remote source;

a control processor responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop, and responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop; and a second ADSL transceiver located in the local communication center for receiving ADSL data in a first direction from the remote source and loading the received ADSL data into predetermined tone bins for ADSL data transmissions over a second subscriber loop to an associated subscriber data equipment, and for receiving ADSL data in a second direction in the predetermined tone bins from the second subscriber loop for processing the ADSL data for data transmissions to the remote source, wherein the control processor is responsive to a detection of an origination of a POTS call on the second subscriber loop for generating a first control signal that causes the second ADSL transceiver to load ADSL data into tone bins which are only in a frequency band above a predetermined frequency band used for a POTS call for ADSL data transmissions over the second subscriber loop, and is responsive to a detection of a termination of a POTS call on the second subscriber loop for generating a second control signal that causes the second ADSL transceiver to load ADSL data into tone bins which are in both the predetermined frequency band used for a POTS call and the frequency band thereabove for ADSL data transmissions over the second subscriber loop.

17. The apparatus of claim 16 wherein the control processor is responsive to an origination of a POTS call in the first or second direction over the second subscriber loop for generating a third control signal which is transmitted as part of the ADSL data in the tone bins being transmitted over the second subscriber loop to a second subscriber modem at the subscriber end of the second subscriber loop to cause the second subscriber modem to load ADSL data into tone bins which are in a frequency band above the predetermined frequency band used for the POTS call for ADSL data transmissions over the second subscriber loop to the second ADSL transceiver in the local communication center, and is responsive to a termination of a POTS call on the second subscriber loop for generating a fourth control signal which is transmitted as part of the ADSL data in the tone bins over the second subscriber loop to the second subscriber modem to cause the second subscriber modem to load ADSL data into tone bins which are in both the predetermined frequency band used for the POTS call and the frequency band thereabove for ADSL data transmissions over the second subscriber loop to the second ADSL transceiver in the local communication center.

18. The apparatus of claim 17 wherein the second subscriber modem comprises:

an ADSL transceiver for receiving both ADSL data signals and the third or fourth control signal from the second ADSL transceiver in the local communication center and for generating separate data output signals and the third or fourth control output signal; and a control processor responsive to the third control output signal from the second subscriber modem ADSL transceiver for generating a fifth control signal that causes the second subscriber modem ADSL transceiver to (a) unload the ADSL data received in the tone bins which are only in the frequency band above the predetermined frequency band used for a POTS call for data transmissions to the second subscriber data equipment, and (b) to load ADSL data from the second subscriber data equipment into tone bins which are only in the frequency band above the frequency band used for a POTS call for ADSL data transmissions over the second subscriber loop to the second ADSL transceiver in the local communication center, and is responsive to the fourth output control signal received from the second subscriber modem ADSL transceiver for generating a sixth control signal that causes the second subscriber modem ADSL transceiver to (c) unload the ADSL data received in the tone bins which are in both the frequency band for a POTS call and the frequency band thereabove for data transmissions to the second subscriber data equipment, and (d) load ADSL data into tone bins which are in both the frequency band normally used for the POTS call transmissions and the frequency band thereabove for ADSL data transmissions over the second subscriber loop to the second ADSL transceiver in the local communication center.

19. An apparatus for implementing bidirectional Asymmetric Digital Subscriber Line (ADSL) data service and Plain Old Telephone Service (POTS) over a subscriber loop comprising:

an integrated line circuit (ILC) located in a local communication center comprising:

detecting and processing circuitry for detecting an origination or termination of a POTS call directed to or from a subscriber coupled to the subscriber loop, and for bidirectionally processing the POTS call for transmission between a remote source and the subscriber loop;

an ADSL transceiver for receiving ADSL data in a first direction from a remote source and loading the received ADSL data into predetermined tone bins for data transmissions over the subscriber loop to subscriber data equipment, and for receiving ADSL data in a second direction in the predetermined tone bins from the subscriber loop for processing the ADSL data for data transmission to the remote source;

a control processor responsive to a detection of an origination of a POTS call by the detecting and processing circuitry for generating a first control signal that causes the ADSL transceiver to load ADSL data into tone bins which are only in a frequency band above a predetermined frequency band used for a POTS call for ADSL data transmissions over the subscriber loop, and responsive to a detection of a termination of a POTS call by the detecting and processing circuitry for generating a second control signal that causes the ADSL transceiver to load ADSL data into tone bins which are in both the predetermined frequency band used for a POTS call and the frequency band thereabove for ADSL data transmissions over the subscriber loop;

an ADSL transceiver located at a subscriber location for receiving ADSL data in a first direction over the subscriber loop from the ADSL transceiver in the local communication center and unloading the received ADSL data from predetermined tone bins for transmission over the subscriber loop to subscriber data equipment, and for receiving ADSL data in a second direction from the subscriber data equipment and loading the ADSL data into predetermined tone bins for transmission over the subscriber loop to the ADSL transceiver in the local communication center; and a control processor located at the subscriber location responsive to a detection of an origination of a POTS call for generating a first control signal that causes the ADSL transceiver to load ADSL data into tone bins which are only in a frequency band above a predetermined frequency band used for a POTS call for data transmissions over the subscriber loop to the ADSL transceiver in the local communication center, and responsive to a detection of a termination of a POTS call for generating a second control signal that causes the ADSL transceiver to load ADSL data into tone bins which are in both the predetermined frequency band used for a POTS call and the frequency band thereabove for data transmissions over the subscriber loop to the ADSL transceiver in the local communication center.

20. The apparatus of claim 19 further comprising:

a ringing and DC level detector for detecting either one of a ringing signal on the subscriber loop or a DC level change on the subscriber loop indicating the initiation of POTS call for generating a first output control signal, and for detecting a termination of a POTS call at the subscriber location, for generating a second control output signal; and the control processor is responsive to the first control output signal from the ringing and DC level detector for generating the first control signal to the ADSL transceiver at a subscriber location, and is responsive to the second control output signal from the ringing and DC level detector for generating the second control signal to the ADSL transceiver at a subscriber location.

* * * * *